Jan. 25, 1938.　　　C. DOERING ET AL　　　2,106,630
METHOD OF AND APPARATUS FOR REMOVING FOREIGN MATTER FROM LIQUIDS
Filed Sept. 22, 1934　　　5 Sheets-Sheet 1
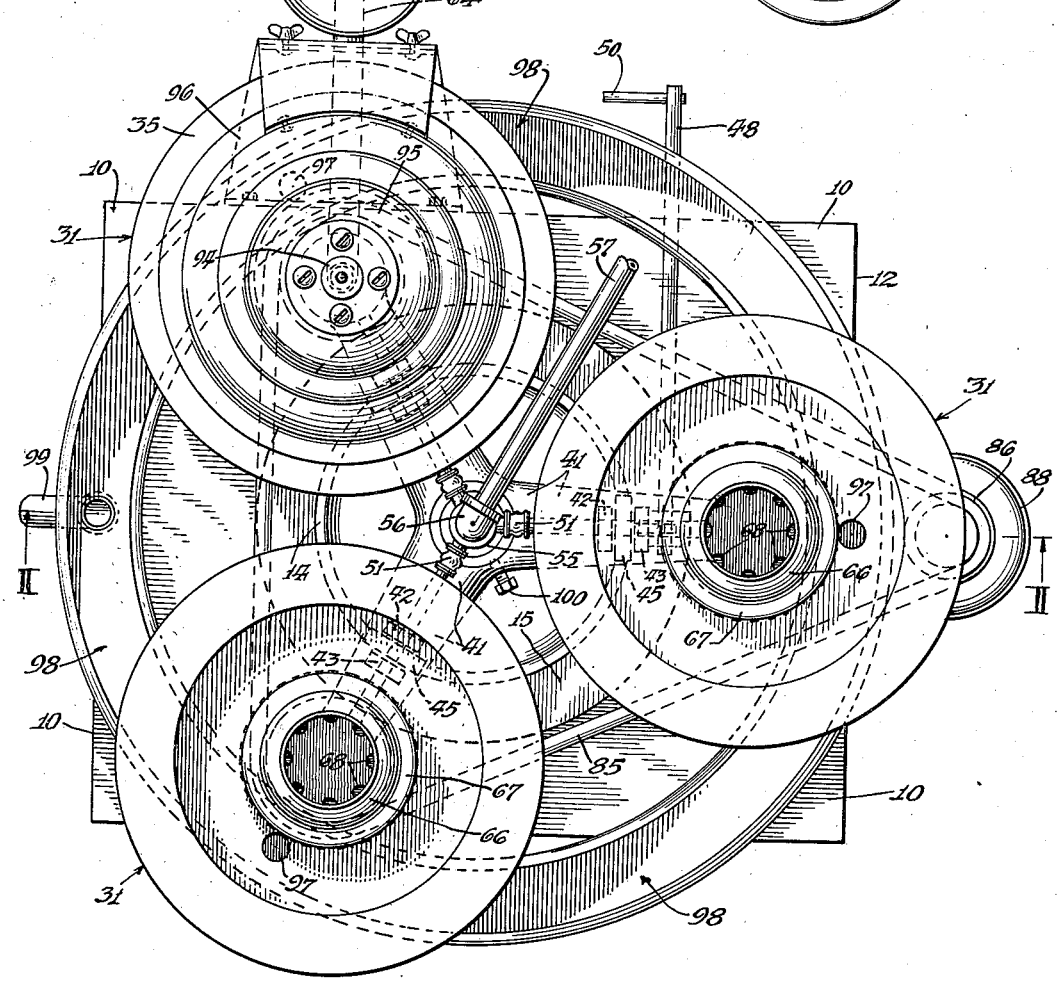

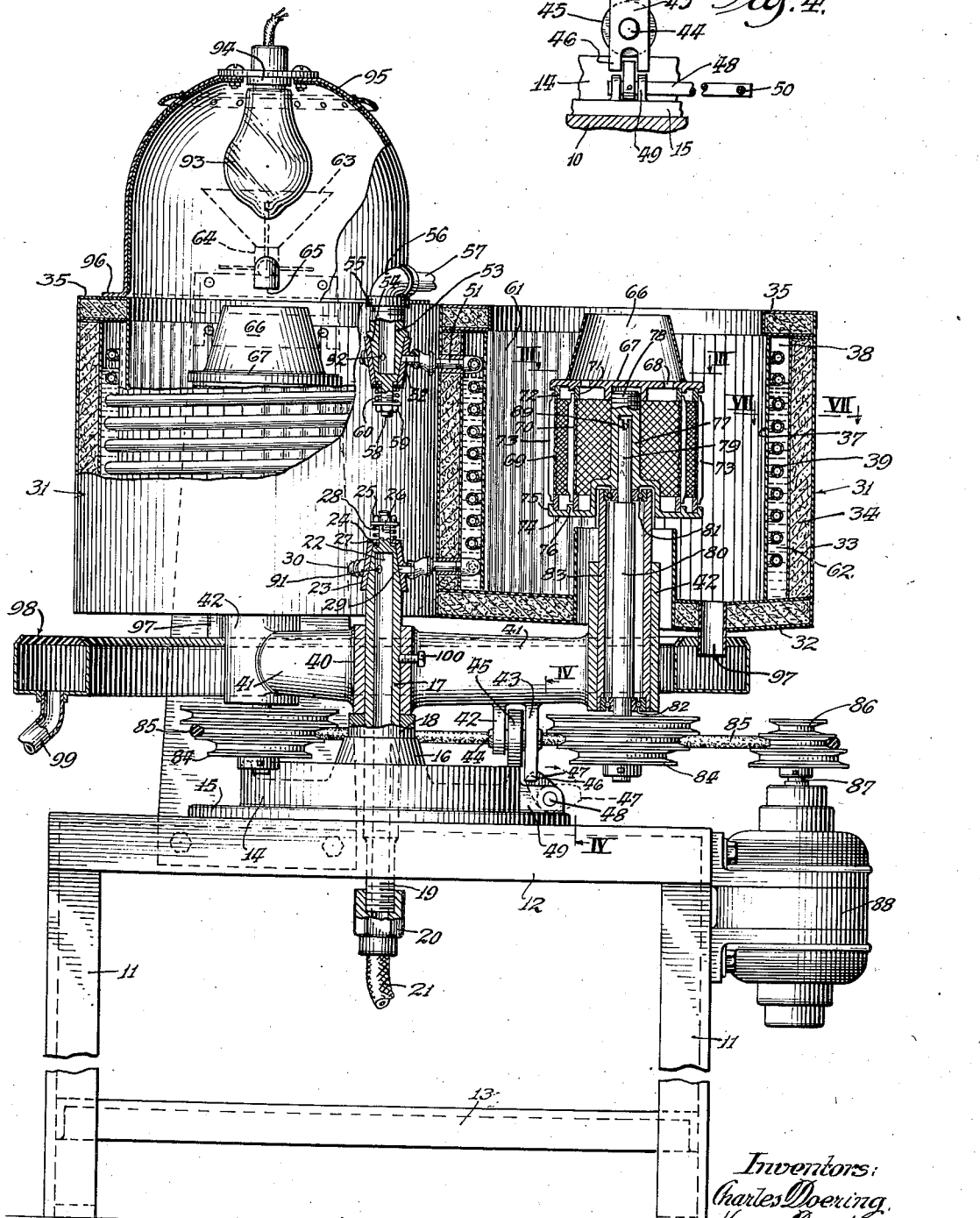

Jan. 25, 1938.    C. DOERING ET AL    2,106,630
METHOD OF AND APPARATUS FOR REMOVING FOREIGN MATTER FROM LIQUIDS
Filed Sept. 22, 1934    5 Sheets-Sheet 3

Inventors:
Charles Doering,
Henry Doering,
By Harry C. Liberty
Attorney

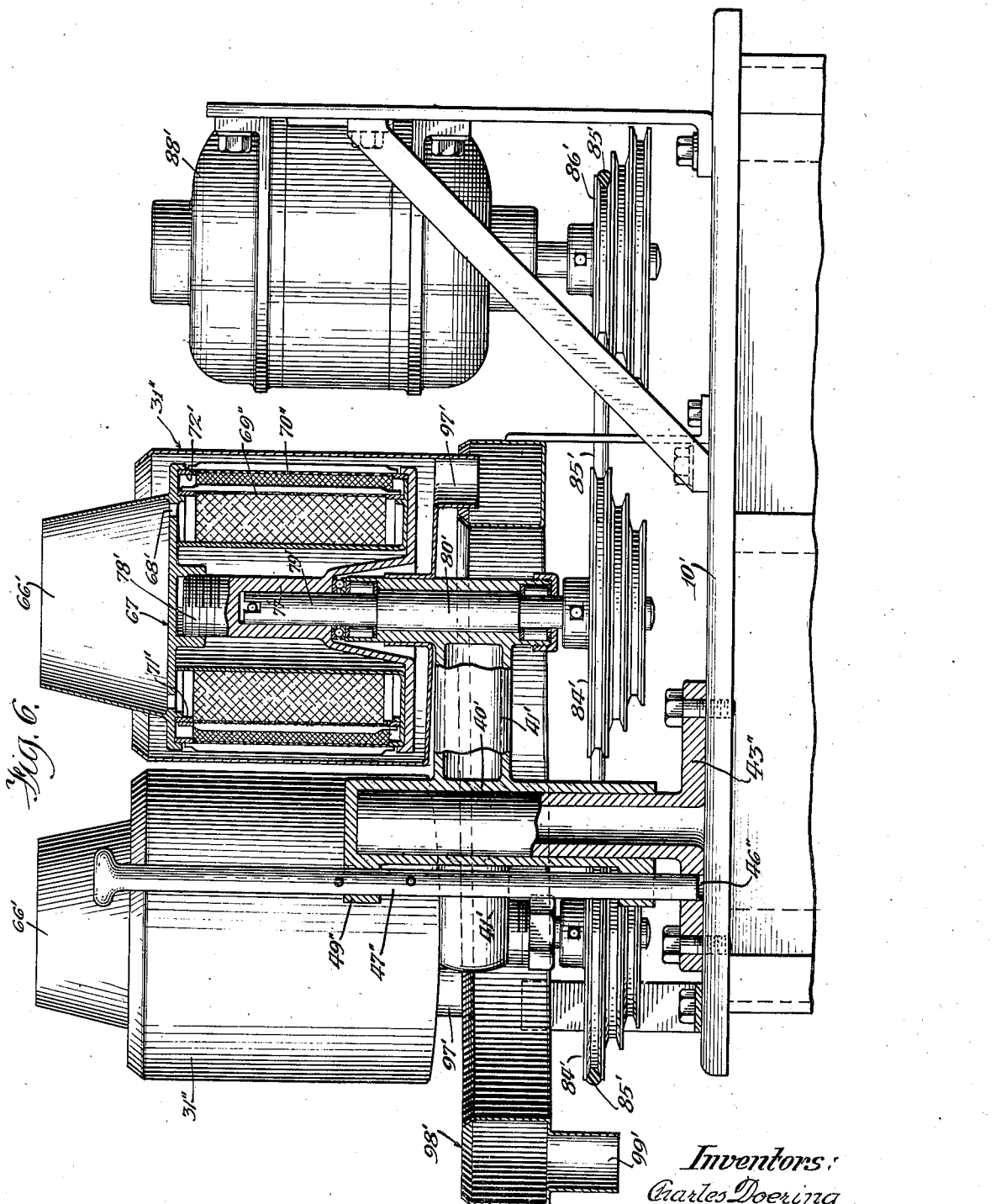

Jan. 25, 1938.   C. DOERING ET AL   2,106,630
METHOD OF AND APPARATUS FOR REMOVING FOREIGN MATTER FROM LIQUIDS
Filed Sept. 22, 1934   5 Sheets-Sheet 5
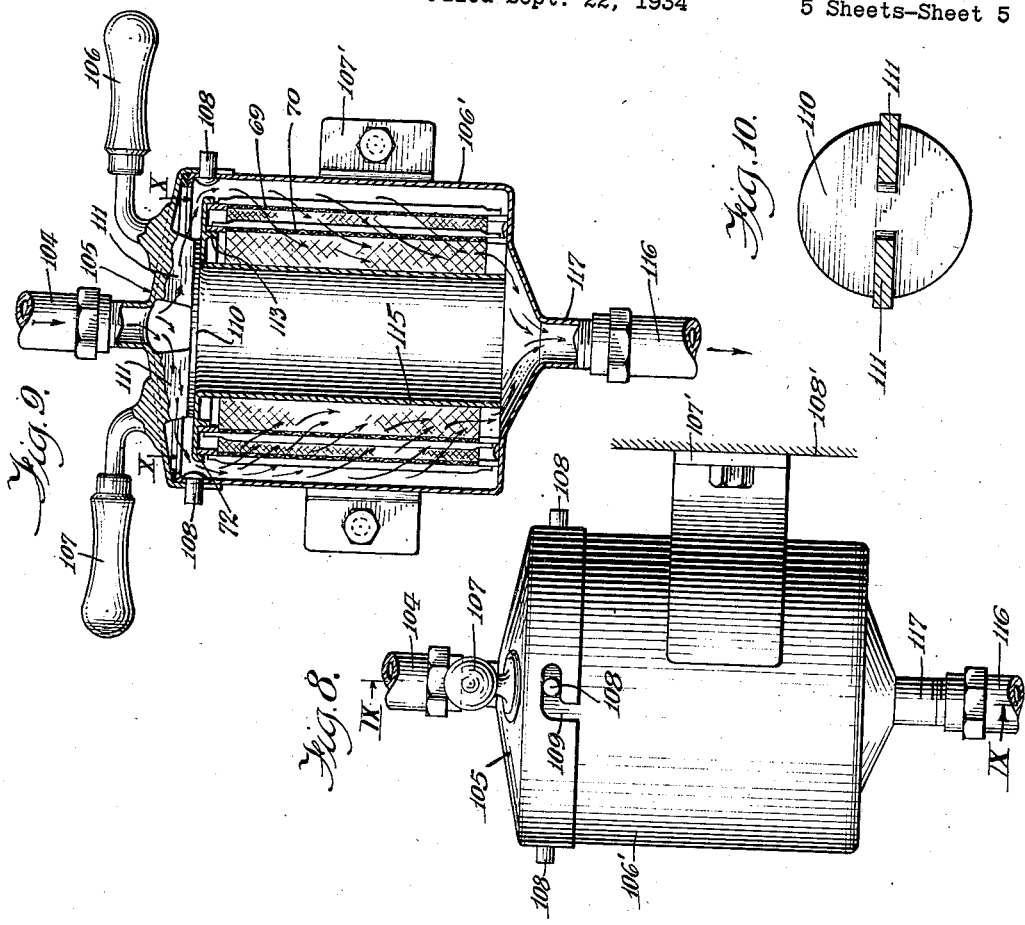
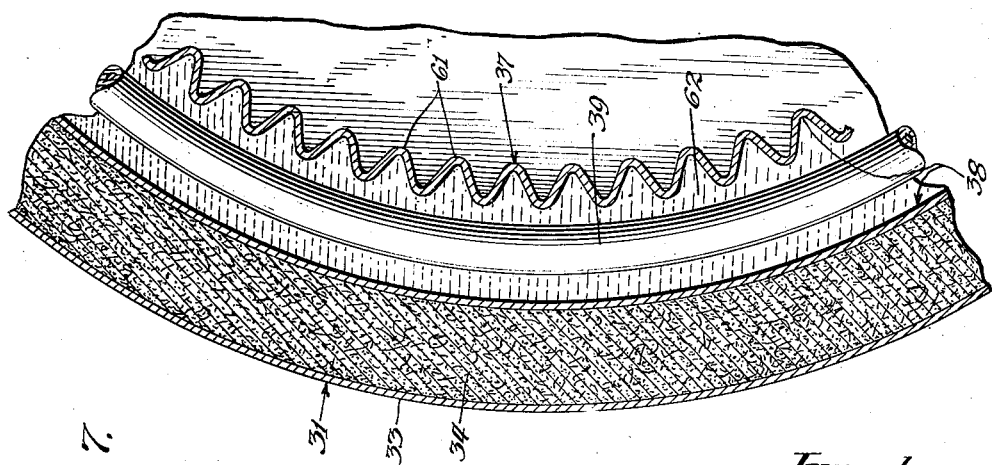
Inventors:
Charles Doering,
Henry Doering,
By Larry C. Deberto
Attorney.

Patented Jan. 25, 1938

2,106,630

UNITED STATES PATENT OFFICE 2,106,630

METHOD OF AND APPARATUS FOR REMOVING FOREIGN MATTER FROM LIQUIDS

Charles Doering and Henry Doering, Chicago, Ill.

Application September 22, 1934, Serial No. 745,057

1 Claim. (Cl. 210—63)

This invention relates to liquid purifying and vitamizing devices and more particularly to machines for removing all foreign matter from edible liquids and imparting vitamins thereto, although certain features thereof may be employed with equal advantage for other purposes.

It contemplates more especially the provision of means for extracting the impurities and foreign matters from liquids without resort to pressure and similar expedients heretofore employed for that purpose, thereby insuring utmost sanitation, continuous operation, and improvement in the vitamin qualities of such products.

Dairy liquids such as cream and kindred edible foods customarily contain comparatively large quantities of foreign substances in addition to the usual micro-organisms that are eliminated or at least rendered inactive by pasteurization. Pasteurization tends to preclude or at least retard deterioration occasioned by bacteria infestation and culture at ordinary temperatures, but dairy products like cream contain many additional foreign substances which are inherent therein or are intermixed therewith during the handling thereof and exposure to the atmosphere in environs that are anything but sterile or clean. Fundamentally, the difficulty of cleansing liquids or dairy products with a pressure sieve or other known expedients is the inability to prevent the foreign constituents from being passed therethrough with the liquid to be cleansed, for dairy products such as cream consist of fat globules having a strong affinity for all foreign substances such as slime, insect bodies, ant eggs, micro-organisms, dirt from the atmosphere or included therein by hand contact in cow milking, and such other undesirable matter that is usually prevalent around farms, pasteurizing equipment, dairies and the creameries. It has been the practice, therefore, of employing pressure sieves and strainers after heat pasteurization in an attempt to remove these foreign substances, but such expedients require intermittent replacements and the foreign substances for the most part pass through with the fat globules so that this is not productive of uniformity or any appreciable purification. Then, too, the incorporation of chemicals is quite essential with customary processes of attempted purification, but this is accomplished at the expense of adulteration which for the most part is prohibited by the pure food laws.

As a consequence the known devices for effecting purification which require the subjection of the dairy products to crude methods of straining and pressure expedients, have not acquired perfection from both the standpoint of continuous production and cleanliness in the resulting product. The present invention makes possible the removal of impurities and foreign substances from the fat globules comprising the cream or other dairy product without interruption and as a step in the continuous processing to insure the separation of the foreign substances therefrom and impart increased smoothness thereto responsive to the purification thereof without resort to adulterants such as chemicals or pressure strainers. Moreover, edible dairy products are rendered more stable and improved in texture, color and odor by the subjection thereof to purification in a manner prescribed by the teachings of the instant invention which is productive of a decidedly superior product from a sanitary and taste standpoint.

Dairy products are especially appetizing when possessed of a fine consistency and purified to a degree that enables the decidedly improved taste owing to the purity and more or less wholesome condition thereof which results from processing in accordance with the teachings of the present invention. The keeping qualities and texture thereof are enhanced even more by resort to primarily mechanical rather than thermal processing to impart utmost purity and an accentuated homogeneous consistency with better keeping qualities to the natural dairy product. Improved texture with enhanced taste characteristics and purity are acquired without interfering with continuous production operations and undesirable pressure and/or crude strainers have been dispensed with. Thus, a vitamized and pure liquid is produced without the slightest adulteration nor processing impairment in that such is effected in continuous sequence with the steps of initial pasteurization and subsequent purification treatment.

One object of the present invention is the provision of novel means for purifying liquids to insure complete sanitation prior to consumption.

Another object is to provide means for continuously effecting the purification of liquids on a large volume scale without resort to pressure strainers.

Still another object is the provision of means for improving dairy liquids by thorough mechanical rather than chemical purification thereof.

A further object is the provision of means for more satisfactorily purifying and vitamizing edible liquids by the subjection thereof to improved mechanical expedients for accomplishing that purpose.

A still further object is to provide novel mechanical means for purifying edible liquids to improve the texture and taste qualities thereof without interfering with the continuity of any desired processing.

Still a further object is the provision of a novel combination of elements for mechanically purifying edible liquid substances resulting in a superior product having enhanced vitamin content, better keeping qualities, improved taste, better texture and a more desirable color than in its initial or natural state.

An additional object is to provide means for purifying and vitamizing liquids in a continuous processing treatment without resort to adulerants or pressure expedients that have proved highly unsatisfactory.

Other objects and advantages will appear from the following description of an illustrated embodiment of the present invention.

In the drawings:

Figure 1 is a plan view of a device embodying features of the present invention.

Figure 2 is a sectional view taken substantially along line II—II of Figure 1.

Figure 3 is a sectional view taken substantially along line III—III of Figure 2.

Figure 4 is an enlarged fragmentary view in elevation of the indexing device taken substantially along line IV—IV of Figure 2.

Figure 6 is a sectional view in elevation of a modified embodiment of the present invention, it comprising a simplified purifying device.

Figure 7 is an enlarged fragmentary sectional view taken substantially along line VII—VII of Figure 2.

Figure 8 is a view in elevation of a strainer cleansing device.

Figure 9 is a sectional view in elevation taken substantially along line IX—IX of Figure 8.

Figure 10 is a sectional view taken substantially along line X—X of Figure 9.

Figure 5:
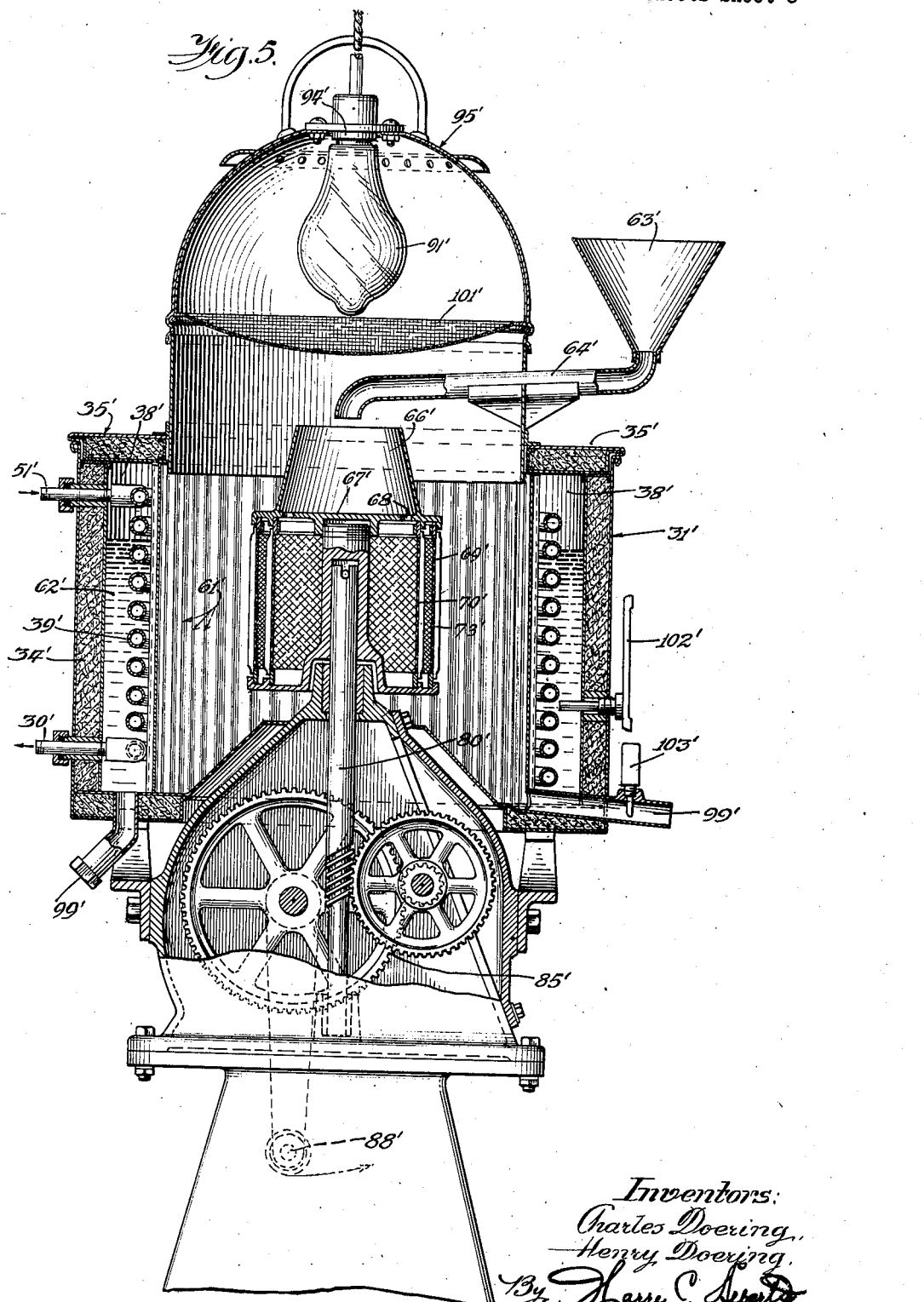
Figure 5 is a sectional view in elevation of a modified embodiment of the invention disclosed in Figure 2, it comprising a single hand operated unit.

The structure selected for illustration comprises a flat supporting surface 10 which is elevated from the floor by means of corner standards 11 having cross members 12 and 13 extending therebetween so as to rigidify the structure and enable the surface 10 to sustain the instrumentalities to be hereinafter described. As shown, a circular base member 14 has an enlarged peripheral flange 15 to rest upon the surface 10 for attachment thereto in any appropriate manner. The base member 14 has an upwardly extending boss 16 of frusto-conical configuration, it being axially bored to receive a vertical tubular shaft 17. A collar bearing 18 is attached to the tubular shaft 17 for engagement with the top surface of the boss 16 so as to vertically support the shaft 17 in position against any possible descent relative to the boss 16.

To this end, the supporting surface 10 is suitably apertured so that the tubular shaft 17 may extend therethrough to terminate in a reduced threaded extension 19 for detachable connection to a nipple 20 thereto. The nipple 20 is secured to a conduit 21 which communicates with the source of supply for a brine or other cooling refrigerant that circulates therethrough to pass upwardly through the tubular shaft 17 for eventual discharge therefrom as at its top extremity 22 which has a conical exterior 23 to serve as a complement for a distributor 24 of corresponding configuration. In this instance, the distributor 24 is retained in position on the top extremity of the tubular shaft 17 by virtue of a nut or other fastener 25 which is in threaded engagement with a stud 26 constituting an axial extension of the shaft 17. A washer 27 is placed upon the stud 26 to contact with the distributor 24 for retention in position responsive to the urge of a spring 28 that envelopes the stud 26 between the fastener 25 and the washer 27, thereby creating a hermetic seal between the distributor 24 and the conical shaft extremity 23 while permitting relative rotation therebetween.

Discharge ports 29, in this instance three, are provided in the distributor 24 for communication with conduits 30 that extend through a plurality of containers 31 which are preferably though not essentially thermally insulated for treatment of the liquids that are to be processed in a manner that will appear more fully hereinafter. To this end, the containers 31 are provided with a chambered bottom 32 and a correspondingly constructed peripheral upstanding wall 33 which is filled with insulation 34 to minimize the thermal communication, transmission, or conduction from the exterior to the interior or vice versa. A chambered annulus or ring member 35 rests upon the peripheral wall 33 so as to define an opening 36 which is somewhat smaller than the diametric extent of the internal shell 37 that is spaced from the insulated peripheral wall 33 to define an annular chamber 38 for confinement of cooling coils 39.

The containers 31, in this instance three, are uniformly spaced around the axis defined by the tubular shaft 17 for support by a rotary vertical bearing 40 which surrounds the tubular shaft 17 and is sustained upon the collar member 18 for journalled rotation relative thereto. The vertical bearing 40 is provided with radially extending arms 41, in this instance three, which terminate in upstanding tubular extremities 42 that are connected with the bottom 32 of the containers 31 for fixed association and support thereon. In order to more stably sustain the containers 31 and enable the rotation with the vertical bearing 14 relative to the tubular shaft 17, the arms 41 are provided with depending lugs 42 and 43 which carry a stub shaft 44 whereon a wheel 45 is mounted so that the periphery thereof contacts with the upper surface of the base member 14 so as to provide additional support for the vertical bearing 40 as well as the containers 31 that are sustained by the arms 41.

It is to be noted that the lug 43 is longer than the lug 42 and has a furcated extremity as at 46 to enable registry with a lever 47 that is pivotally mounted as at 48 to a boss 49 fixed to the peripheral wall of the base member 14 in integral association with the flange 15 thereof (Figures 2 and 4). The lever 47 can be actuated responsive to the rod 48 that serves as a support therefor between the furcations 49, it extending for a distance sufficient to enable access to a handle member 50 that enables the rotation of the lever 47 in one direction or the other for registry and disengagement relative to the furcation 46 in the lug 43, thereby indexing the containers 31 to assume a definite and predetermined radial position for reasons that will appear more fully hereinafter.

It is to be noted that the cooling coils 37 in each of the containers 31 terminate in conduits 51 that extend through the thermally insulated walls 33 toward the axis of the three containers 31 so as to establish communication with ports 52 provided in a distributor 53 of frusto-conical configuration similar to the distributor 24 and in axial vertical alignment therewith. The distributor 53 is complemental to the conically shaped surface extremity 54 provided on the tubular member 55 that is in threaded connection with an elbow 56 connected to a pipe 57 which completes the external circulation of the cooling fluid or refrigerant in conjunction with the conduit 21. As shown, the tubular member 55 terminates in a stud 58 that carries the fastener or nut 59 to retain a spring 60 in enveloping relation therewith in much the same manner as the spring 28 for creating a hermetic seal between the distributor 54 and tubular member 55 affording relative rotation therebetween.

As shown, the interior shell 37 is preferably provided with vertically extending corrugations 61 to present an increased surface area for more effective cooling resulting from the brine solution 62 that may be confined in the chambered annulus 38 that holds the refrigerant coils 37. In order to treat the liquid such as cream, a supply thereof is conducted to the funnel 63 that is supported proximate to the exterior circumference of rotation of the containers 31 for communication with a pipe 64 which serves to conduct the liquid to the discharge orifice 65 that is disposed above the axis of one of the containers 31 so as to discharge the liquid to a frusto-conical receptacle 66 disposed therebelow for support by a plate 67 constituting the top surface of a strainer device. As shown, the plate 67 is provided with a plurality of circumferentially spaced apertures 68 that afford the passage of the fluid therethrough for entrance into a cylindrical strainer 69 which may consist of finely woven wire or comprise an apertured metallic member that is non-corroding and give the effect of a 250-mesh strainer or any other size that commercial practice may dictate.

A finer cylindrical strainer 70 of increased diameter is concentrically mounted relative to the strainer 69 and preferably though not essentially is of metallic construction so as to retain very minute foreign substances that are usually retained by a 250-mesh strainer or other size that may deem most satisfactory and effective for that purpose. It is to be noted that the cylindrical strainers 69 and 70 have circular bands 71 and 72 that define the extremities thereof and are vertically spaced by rods 73 which impart a rigidity thereto and enable the concentric assembly thereof between the top plate 67 and a bottom plate 74 which are provided with confronting circumferential ridges 75 and 76 to maintain the strainers 69 and 70 in fixed spaced relation for the fluids to be centrifugally pressed therethrough.

To this end the bottom plate 74 is provided with an upwardly extending axial member 77 which is in threaded engagement with the top plate 67 as at 78 and is tubular for a substantial distance to receive the reduced portion 79 of a shaft 80 which is sustained in bearings 81 and 82 for rotation within a cylindrical sleeve 83 which is fixed to the upstanding extension 42 to rotatively support the shaft 80 in each of the containers 31 to impart rotation to the strainers 69 and 70 as well as its auxiliary parts in fixed assembly therewith. Each of the shafts 80 terminates in pulleys 84 fixed thereto for rotation therewith. The pulleys 84 are provided with a plurality of different sized peripheral grooves so as to receive a belt 85 that engages corresponding grooves in the pulleys 84 for traction therewith in conjunction with a pulley 86 fixed to the armature shaft 87 of an electric motor 88.

The armature shaft pulley 86 is also provided with a plurality of grooves which are reversely fixed relative to the grooves provided in the pulleys 84 so that different speeds of rotation can be imparted to the shafts 80 so as to procure the desired adjustability on the centrifugal urge that is imparted to the liquids that pass to the receptacles 66 and emerge from the finer strainer 70 in the form of a mist for direction against the corrugations 61 of the interior shell 37. The motor 88 is attached to the standards 11 or at the side of the supporting structure 10 for the base 14; and the strainer assembly 69—70 together with its axial member 77 is removable and capable of disengagement from the shafts 80 by merely elevating such for separation of a pin 89 that diametrically bridges the tubular opening of the axial member 77 for registry with a notch provided in the extremity of the shaft extension 79. This affords the cleanings of the strainers 69 and 70 as will appear more fully hereinafter.

It is to be noted that only one container 31 is preferably utilized for treatment of liquids that flow from the funnel 63, and the lever 47 when in registry with the furcation 46 of the lug 43, indexes the containers 31 so as to singly receive the fluid. In this connection it should be noted that the tubular shaft 17 as well as its corresponding member 55 have but a single aperture 91 and 92, respectively, so that the container 31 in registry with the funnel 63 will also have the brine or refrigerant circulated therethrough for registry with its corresponding part 30. The other containers 31 are not in registry therewith so that the refrigerant does not flow therethrough and such is readily adjusted for substitution with a container 31 that has received the liquid for a time sufficient to warrant cleansing of the strainers 69—70 therein. When this is desired, the lever 47 is disengaged from the furcated extremity of the lug 43, and the next container is rotated with the vertical bearing 40 and its arms 41 to a position in communication with the funnel 63 for continued treatment of liquids without any appreciable interruption. This affords substantially continuous treatment of the fluids and maintains a screen 69—70 of each of the containers 31 capable of ready cleansing and preparation for successive operation.

With the rotation of the screens 69—70 within the container 31 that is receiving the liquid from the funnel 63, the foreign matter is removed therefrom and the liquid is expressed through the screens in a clean and wholesome manner in the form of a mist that is directed radially against the corrugations of the wall defining the internal shell 37. During this mist formation, pasteurization of the fluid in the form of a mist as well as vitamins may be imparted thereto by subjection to the rays of an ultra violet lamp 93 supported, in this instance, by a socket 94 which is detachably connected to a dome 95 that terminates in a peripheral flange 96 to rest upon the ring member or annulus 35 so as to completely enclose the orifice 36 that serves as an opening for the internal shell 37. Consequently, irradiation of the liquid is effected so as to impart a pasteurizing effect thereto as well as provide a vitamin content during the continuous processing thereof to remove the foreign matter as well as to improve the taste and keeping qualities thereof.

It should be observed that the liquid such as cream may be pasteurized prior to its discharge into the funnel 63 and that irradiation thereof with ultra violet rays merely increases the sterility thereof and imparts vitamin D thereto. The liquid thus treated flows down the corrugations 61 of the internal shell 37 and is discharged through a pipe 97 that communicates with the interior of each of the containers 31 through the bottom thereof for discharge into a circular collector or receptacle 98 that surrounds the containers 31 beneath the bottom 32 thereof. Consequently, the liquids from each of the containers 31 is discharged to the collector 98 which has a tubular connection 99 to enable the discharge thereof to a receptacle for storage or further processing into other products within the dictates of commercial practice.

A set screw 100 extends radially through the vertical bearing 40 to engage the tubular shaft 17 so that the containers 31 may be fixed against rotation or sufficient friction created therebetween to preclude too much freedom of motion during the adjustment thereof from one container 31 to the next for successive use in the treatment of liquids so as to enable the command of clean strainers 69—70 at all times without any appreciable interruption in the continuity of liquid treatment.

A similar device is shown in Figure 5 wherein a single container 31' is employed and the strainers 69'—70' are concentrically arranged for rotation with the shaft 80' responsive to a train of gears 85' which are actuated responsive to a handle member 88'. A screen or other suitable protecting medium 101' is disposed beneath the lamp 95' and above the liquid which flows through the conduit 64' from the funnel 63'. Otherwise, the operation is the same and it is worthy of note that thermometers 102' and 103' will be provided in any desired location in order to govern and indicate the temperature of the cooling medium as well as the treated liquid as it issues from the discharge pipe 99'. The ultra violet ray lamp 93 is rendered detachable together with a socket support 94 so that it may be removed or utilized for other purposes. This device is hand operated for use on the farm directly at the point of dairy liquid production. It may be power driven, but the simple single straining unit may prove of value in hand manipulation in such situations.

In the modified embodiment shown in Figure 6, the ultra violet ray treatment is dispensed with and also the cooling or heating expedient that was described in conjunction with the preferred embodiment. In this modified embodiment, a plurality of containers 31'' are similarly employed, but the cooling or heating coils 37 are entirely dispensed with and the containers 31'' are not thermally insulated. The structural details are, however, substantially similar and an indexing rod 47'' is provided so as to be reciprocal within the bracket 49'' for registry and disengagement with an aperture 46''' provided in the bracket 43'' so that successive containers 31'' may be employed and properly indexed so as to enable successive treatment with clean strainers 69''—70'' without appreciably interfering with or delaying the continuity of liquid treatment. While three straining units 31'' are also shown in this embodiment, it should be understood that any number thereof may be utilized depending upon the dictates of commercial practice and the requirements of any particular installation.

The vitamizing treatment by subjection of the liquid to ultra violet rays may be enhanced by incorporating the extract of vitamin bearing substances; in this connection, the extract or juice that may be received from vegetables such as lettuce can be incorporated with the liquid to enlarge or improve its vitamin D content. This clearly improves the vitamins in the liquid which coupled by the purification thereof, renders the product greatly enhanced in food and body building qualities. The extracts of vitamin bearing substances may be incorporated in the treated liquid subsequent to the straining thereof, and there is no requirement to interfere with or retard the continuous processing or treatment thereof by imparting increased vitamin D properties therein. The cleansing treatment involves the removal of the cylindrical strainers 69—70 for subjection to steam which is supplied to a pipe 104 having communication with a closure member 105 which may serve as the top of the cleansing housing 106.

To this end, the closure member 105 is provided with handles 106 and 107 to enable the manipulation thereof for attachment and detachment responsive to the provision of complemental pins 108, in this instance four, that are radially projected from the cleansing housing 106' near the open end thereof for registry with correspondingly sized bayonet slots 109 that afford the connection and disconnection responsive to manipulating the handles 106 and 107 by effecting relative rotary movement therebetween. As shown, the cleansing housing 106' may be sustained by a bracket 107' fixed to a vertical wall 108' in the vicinity of the purifying apparatus that has been described supra. In order to hold the strainers 69—70 in the cleansing housing 106', the closure member 105 is provided with a depending plate 110 which is integrally or otherwise attached thereto through the medium of ribs 111 which enable the passage of the steam above the plate 110 and around the strainers 69—70 after being placed within the cleansing housing 106'. The strainers 69—70 are held in concentrically spaced relation by means of a disc 112 that has peripheral ridges 113 and 114 formed on the underside thereof as a complement of the ring members 71 and 72 comprising a part of the strainer assembly 69—70.

The retaining plate 112 terminates in a tubular axial member 115 which extends for the interior depth of the cleansing housing 106' to preclude the steam from directly passing therethrough to the discharge conduit 116 that is connected to the bottom of the housing 106' through its threaded discharge spout 117. In view of the fact that the closure plate 110 rests against the axial tubular member 116, the steam must enter the strainers 69—70 from the exterior surfaces thereof and pass inwardly so as to collect and remove all foreign matter therefrom for eventual discharge through the pipe 116. Obviously, the strainers may be of any desired construction and may involve a metallic or cloth structure depending upon the requirements of commercial practice.

Various changes may be made in the embodiment of the invention herein specifically described without departing from or sacrificing any of the advantages of the invention as defined in the appended claim.

We claim:

In a device of the character described, the combination with a plurality of housings, of a plurality of concentrically arranged cylindrical strainers varying in mesh fineness in each of said housings, means for directing a flow of liquid along a predetermined path, means for mounting said strainer housings for successive displacement in said path of liquid flow, indexing means for successively maintaining said strainer housings in said path of liquid flow, means for rotating the strainer housing in said path to more effectively pass the liquid therethrough, said housings having corrugated interior wall surfaces, and cooling coils mounted in said housing walls and adjacent said corrugated surfaces.

CHARLES DOERING.
HENRY DOERING.